United States Patent [19]

Mets

[11] 4,263,891
[45] Apr. 28, 1981

[54] RANGE VENTILATOR

[76] Inventor: Ilmar Mets, Hasselquistvägen 21, S-121 46 Johanneshov, Sweden

[21] Appl. No.: 74,334

[22] Filed: Sep. 11, 1979

Related U.S. Application Data

[63] Continuation of Ser. No. 853,510, Nov. 21, 1977, abandoned.

[30] Foreign Application Priority Data

Nov. 30, 1976 [SE] Sweden ................................ 7613424

[51] Int. Cl.³ .............................................. F24C 15/20
[52] U.S. Cl. ............................ 126/299 D; 126/299 R; 98/115 R; 55/DIG. 36; 165/154; 165/160
[58] Field of Search ....................... 126/299 D, 299 R; 55/DIG. 36; 165/154, 159, 160, DIG. 2; 98/115 K, 115 R, 115 LH

[56] References Cited

U.S. PATENT DOCUMENTS

| 2,445,471 | 7/1948 | Buckholdt | 165/154 |
| 2,823,026 | 2/1958 | Damico et al. | 165/154 |
| 4,043,319 | 8/1977 | Jensen | 126/299 D |

FOREIGN PATENT DOCUMENTS 514024 3/1921 France ...................................... 165/159

Primary Examiner—Albert J. Makay
Assistant Examiner—Henry Bennett
Attorney, Agent, or Firm—Young & Thompson

[57] ABSTRACT

A range ventilator is provided in a space with a heat exchanging partition between the contaminated exhaust air and the inflowing outside air. A duct for the exhaust air is formed between the heat exchanging partition constructed in the form of a cylinder of curved corrugated sheet metal and a cylindrical cover which can be disassembled into two halves, around the middle section of the sheet metal cylinder.

4 Claims, 3 Drawing Figures

RANGE VENTILATOR

This is a continuation of application Ser. No. 853,510, filed Nov. 21, 1977 now abandoned.

Drawing out cooking smells from a kitchen is an important part of the ventilation in a dwelling and the departing heat is of importance for the heating economy. To recover heat it is also known to mount heat exchangers in range ventilators. However, these mounted-in heat exchangers have the disadvantage that their ability to recover heat is lessened due to dirt and grease deposits on the heat exchanger surfaces caused by the exhaust air. These deposits necessitate frequent cleaning of the exchanger surfaces in order to achieve the desired effect. A grease filter reduces but does not eliminate the grease deposits.

With plate heat exchangers used up to now in range ventilators, it is also exceptionally difficult to clean the air ducts, since the heat exchanger package must be taken apart and a large number of plates must be individually cleaned. Disassembly, cleaning and reassembly are difficult in a kitchen, and thus cleaning, in practice, is done much too infrequently, and the heat yield is unnecessary low.

The present invention relates to a range ventilator provided in a space with a heat exchanging partition between the contaminated exhaust air and the inflowing outside air. The purpose of the present invention is to disclose a new construction for such a range ventilator, provided with a heat exchanger which can be easily cleaned in a kitchen without having to disassemble the entire ventilator.

A range ventilator constructed according to the invention, which in practical tests has been shown to fulfill said purpose, is primarily characterized in that the duct for the exhaust air is formed between the heat exchanging partition in the form of a cylinder of curved corrugated sheet metal and a cylindrical cover, which can be disassembled in two halves, around the middle section of the sheet metal cylinder. Thus in a range ventilator according to the invention the exhaust air is led through a duct which is formed between the corrugated sheet metal curved into cylinder shape and the cylindrical cover, which can be disassembled into two halves, disposed around the same. Thus only one of the two cover halves need be taken off in order to take out the corrugated sheet metal cylinder for cleaning.

In an especially suitable embodiment of a range ventilator according to the invention the corrugated sheet metal bent into cylindrical shape is provided at its ends with sealing rings for connecting the interior surfaces of the same to the duct for the outside air flowing in through the heat exchanger.

Since a range ventilator according to the invention also suitably includes a range hood with a cabinet placed above the same, in which the heat exchanger arrangement and the ventilator fans are placed, the two cylindrical cover halves can be suitably provided at their ends with projecting end plates for sealing against the walls of said cabinet. On top of the cabinet there are suitable connections for the contaminated exhaust air and for the inflowing outside air. A range ventilator according to the invention can thereby function as a ventilation means for an entire dwelling.

To achieve the maximum effect, the inflowing outside air should be conducted countercurrently to the exhaust air, which should suitably be led upwards, while the inlet air is led downwards.

The invention will be described in more detail in the following with reference to the accompanying drawing showing an embodiment of the same.

Figure 1:
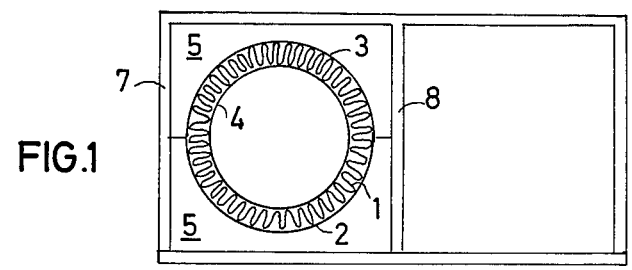
FIG. 1 shows a horizontal section through a heat exchanger according to the invention built into a cabinet.

As can be seen from the drawing, in which the reference numerals are consistent in all of the figures, a heat exchanger in a range ventilator according to the invention comprises corrugated sheet metal 1 bent into cylinder shape and a cylindrical cover disposed around the same and which can be disassembled in two halves 2, 3. A cylindrical filler body 4 is disposed inside the corrugated sheet metal cylinder 1. The contaminated exhaust air passes upwards through the ducts formed between the corrugated sheet metal cylinder 1 and the cover halves 2, 3, while the inlet outside air passes downwards through the ducts formed between the corrugated sheet metal cylinder 1 and the inner cylindrical filler body 4. The cover halves 2 and 3 are provided at the top and bottom with horizontally projecting end plates 5, 6 which seal against the inner walls in a cabinet 7 enclosing the heat exchanger and the fan 15 included in the same.

Figure 2:
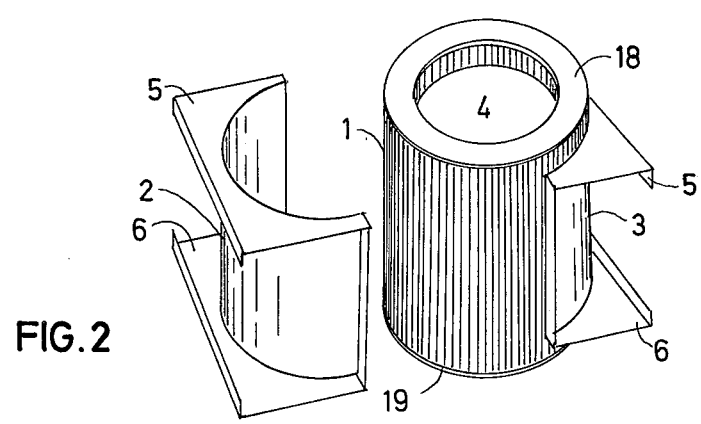
FIG. 2 shows a perspective view of the heat exchanger with one cover half taken off, and finally
Figure 3:
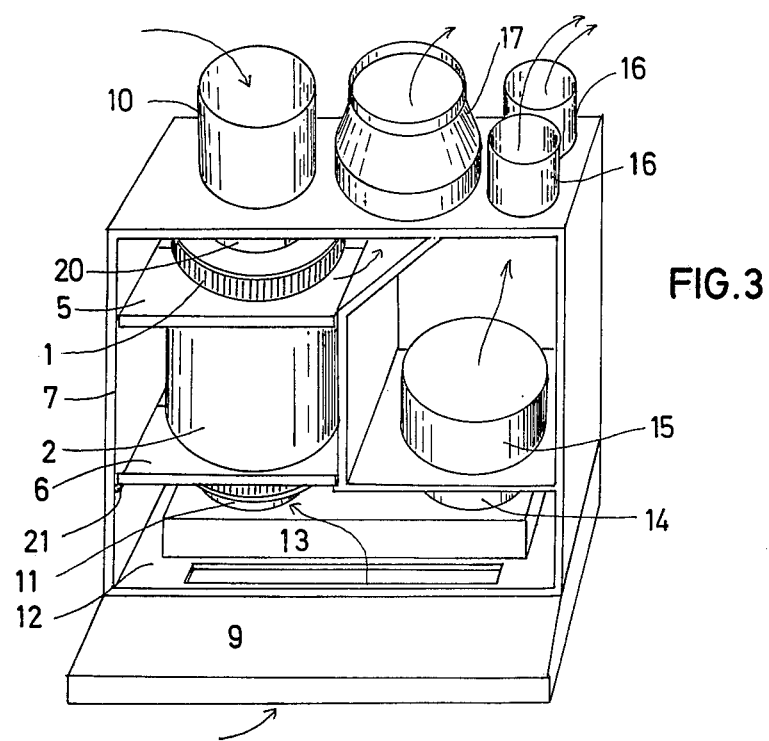
FIG. 3 shows a perspective view of an embodiment of the range ventilator according to the invention built into a cabinet whose front panel has been removed, and with the air paths in the ventilator indicated with arrows.

A complete version of this cabinet 7 is shown in FIG. 3. Here the cabinet is divided into two sections by means of a partition 8 and is directly connected at the bottom to a range hood 9 of common design. In the left-hand section in the figure, a heat exchanger is placed of the type shown in FIGS. 1 and 2. A pipe 20 is connected by means of an extension 10 to an outside air duct (not shown), while the other end of the pipe is sealed by means of a sealing ring 10 against the upper end of the corrugated sheet metal cylinder 1. A lower sealing ring 19 is at the same time pressed against an intake 11 which is located on top of a connecting chamber 13, disposed in the lower portion 12 of the cabinet 7, which through a second outlet 14 and a fan 15 mounted in the cabinet transmits the inflowing outside air to the right-hand side of the cabinet in FIG. 3, through it and out into the dwelling through openings 16 at the top of the cabinet. The flow space in the cabinet 7 after the fan 15 is constructed as a muffler to reduce the noise level in the outside air flowing into the dwelling through the openings 16.

The contaminated air intended for exhaust is led from the range hood 9 and the lower portion 12 of the cabinet 7 directly into the ducts between the cylindrically bent corrugated sheet metal 1 and the outer cover halves 2 and 3 to an exhaust fan 17 and from there to a suitable outlet from the dwelling.

The projecting lower end plates 6 of the cover halves 2, 3 rest on horizontal support ribs 21 mounted on the inner walls of the cabinet 7. In cleaning, the front cover half 2 is removed first and then the corrugated sheet metal cylinder 1, which is the heat exchanging partition between the contaminated exhaust air and the inlet outside air. Then the rear cover half can possibly also be removed. These parts can then be cleaned in the usual manner. These parts are then replaced in the cabinet 7 in the reverse order. The arrangement according to the invention makes it possible for a range ventilator with heat exchanger to be constructed so that it is easy to keep clean, thus maintaining the high capacity of the heat exchanger.

A range ventilator constructed according to the invention can of course also be connected to a central fan-controlled suction system for example. This eliminates the need for the fan 17 in the example described here, and the inducted amount of air must then be adjusted to the capacity of the central suction system.

The invention is not limited to the embodiment described above and shown in the drawing, but can be modified in various way within the scope of the invention.

What I claim is:

1. A range ventilator, comprising a cabinet and means defining separate paths for inflowing outside air to the range and exhaust air from the range, said means comprising a heat exchanging partition in the form of a cylinder of curved corrugated sheet metal that surrounds one of said paths, the other said path surrounding said cylinder, a cylindrical cover in two halves around the middle section of the sheet metal cylinder, said two halves abutting each other along surfaces that extend radially outwardly away from the cylinder beyond the outer periphery of the cylinder, said cylinder and at least one of said cover halves being removable from and reinsertable in the cabinet by movement relative to the other said cover half in a direction perpendicular to the axis of the sheet metal cylinder for ease of cleaning, and at least one radially outwardly projecting plate on each said cylindrical cover half disposed in planes perpendicular to said axis of said cylinder and sealing against the inner sides of the walls of said cabinet to prevent air flowing along said other path from flowing outside said cylindrical cover.

2. A range ventilator as claimed in claim 1, there being two said radially outwardly projecting plates on each said cover half disposed one at each end of each said cover half.

3. A range ventilator as claimed in claim 1, and sealing rings disposed against the corrugated ends of said cylinder and disposed in planes perpendicular to said axis of said cylinder.

4. A range ventilator as claimed in claim 1, said cylindrical cover being of sheet material and said radially outwardly extending abutment surfaces being provided by radially outwardly extending flanges on said halves of said cylindrical cover.

* * * * *